United States Patent [19]

Eadens

[11] Patent Number: 5,408,752
[45] Date of Patent: Apr. 25, 1995

[54] PLUMB TOOL KIT ATTACHABLE TO THE ENDS OF A COMMON LEVEL, OR THE LIKE, USED TO DETERMINE VERTICAL ALIGNMENT

[76] Inventor: Richard L. Eadens, P.O. Box 313, Charlestown, Ind. 47111

[21] Appl. No.: 141,812

[22] Filed: Oct. 22, 1993

[51] Int. Cl.⁶ .......................... G01C 9/26; G01C 9/28
[52] U.S. Cl. ........................................ 33/376; 33/382; 33/390; 33/407
[58] Field of Search ................. 33/370, 371, 376, 381, 33/382, 370, 373, 404, 407, 408

[56] References Cited

U.S. PATENT DOCUMENTS

| | | | |
|---|---|---|---|
| 312,266 | 2/1885 | Gurley . | |
| 354,592 | 12/1886 | Brown | 33/373 |
| 478,309 | 7/1892 | Burchinal | 33/376 |
| 519,576 | 5/1894 | Holt | 33/382 |
| 527,815 | 10/1894 | Schnell . | |
| 1,644,456 | 10/1927 | Winter | 33/370 |
| 1,909,267 | 5/1933 | Golt | 33/370 |
| 2,154,625 | 4/1939 | Kleineschay | 33/370 |
| 2,314,927 | 3/1943 | Farrington | 33/370 |
| 2,541,366 | 2/1951 | Kennedy | 33/382 |
| 3,266,155 | 8/1966 | Staub | 33/370 |
| 3,469,322 | 9/1969 | Eriksson | 33/370 |
| 3,826,013 | 7/1974 | Baher | 33/390 |
| 4,343,093 | 8/1982 | Eadens | 33/373 |
| 4,501,057 | 2/1985 | Palomera | 33/371 |
| 4,970,796 | 11/1990 | Masters et al. | 33/347 |

FOREIGN PATENT DOCUMENTS

| | | | |
|---|---|---|---|
| 2943998 | 5/1981 | Germany | 33/382 |
| 417982 | 2/1967 | Switzerland . | |

*Primary Examiner*—Thomas B. Will
*Attorney, Agent, or Firm*—Middleton & Reutlinger; James C. Eaves, Jr.

[57] ABSTRACT

A plumb tool kit attachable to the ends of a common level member, or the like, used to determine vertical alignment. The kit comprises a pair of end caps each having a cap body. Each cap body has a first and a second arm extending therefrom, the first and said second arms forming a right angle. Each cap body has an opening therein to receive a level, each opening having a preselected orientation wherein when the openings of the pair of end caps receive the, the arms are transverse to the level. The first arms and at least a portion of the level define a first plane and the second arms and at least a portion of the level defining a second plane. One or both of the pair of end caps includes an apparatus for determining vertical alignment, such as, for example, a bull's eye level, wherein when the openings of the pair of end caps receive the level, the bull's eye level has a location in a plane transverse to the level. Alternatively, a pair of transversely aligned tubular level vials can be employed, wherein when the openings of the pair of end caps receive the level, the pair of vials have a location in a plane transverse to the level. The plumb tool kit end caps can include, for example, thumb screws which can be tightened onto the level to retain the end cap onto the level.

12 Claims, 4 Drawing Sheets

PLUMB TOOL KIT ATTACHABLE TO THE ENDS OF A COMMON LEVEL, OR THE LIKE, USED TO DETERMINE VERTICAL ALIGNMENT

BACKGROUND OF THE INVENTION (a) Field of the Invention

The present invention relates to a plumb tool kit attachable to the ends of a common level, or the like, used to determine vertical alignment of posts and the like.

(b) Description of the Prior Art

Applicant's U.S. Pat. No. 4,343,093 teaches a plumb tool which can be attached to an object to be plumbed. U.S. Pat. No. 3,826,013, to Baher, teaches a combined level, square, and plumb tool. U.S. Pat. No. 312,266, to Gurley, teaches a rod plumbing level. Swiss patent reference no. 417,982, to Jäger, teaches a tool for measuring verticality. All of these four references teach a relatively short vertical tool, as compared to Applicant's current invention, which engages the item to be plumbed over a short vertical distance, for example, a foot or less.

U.S. Pat. No. 527,815, to Schnell, teaches a spirit level attachment, used to off-set a spirit level from an item to be leveled horizontally, so that only the two level attachments engage the item. This permits horizontal leveling of items having irregularities, such as, for example, two joined pipes.

U.S. Pat. No. 4,970,796, to Masters et. al., teaches a self supporting spirit level tool.

SUMMARY OF THE INVENTION

The present invention is for a plumb tool kit attachable to the ends of a common level member, or the like, used to determine vertical alignment. The two caps of this kit convert a common level into a post level, which, with a single placement onto a post, can determine verticality of the post. Levels typically come in lengths of from about 1.5 feet to about 8 feet. Some plumb work involves plumbing relatively short posts and some involves plumbing relatively long members, particularly in commercial applications. The prior art teaches post levels having limited spans. With the present invention, the kit can fit any length level. The user selects the right level for the job, attaches the kit, and can, therefore, more accurately determine verticality.

By spanning a greater vertical distance, a truer overall indication of plumbness can be determined. This is particularly useful if a post is not totally straight and multiple readings are required to determine average plumbness. Having a bull's eye level or a pair of transverse vial levels on the lower cap permits easy reading, with verticality being determinable with one positioning of the level with attached kit onto the post to be plumbed. As some operations may require reading at the top or bottom of the level, means to determine verticality can be included with both caps.

There are a plurality of levels already owned and this kit permits them to be easily converted into a post level. A more costly totally separate tool is not required. Even further, an inexpensive plain beam member could be used instead of a level. For example, the kit could be sized to fit the ends of a 2×4.

Finally, the plumb tool kit of the present invention comprises a pair of end caps, each of the pair of end caps having a cap body; each cap body having a first and a second arm extending therefrom, the first and said second arms forming a right angle; each cap body having an opening therein to receive a member, each opening having a preselected orientation wherein when the openings of the pair of end caps receive the member, the arms are transverse to the member, the first arms and at least a portion of the member defining a first plane and the second arms and at least a portion of the member defining a second plane; at least one of the pair of end caps having means for determining vertical alignment. The plumb tool kit end caps can include means for retaining the end cap onto the member. The means for determining vertical alignment can, for example, comprise a bull's eye level, wherein when the openings of the pair of end caps receive the member, the bull's eye level has a location in a plane transverse to the member. As an alternative, the means for determining vertical alignment can, for example, comprise a pair of transversely aligned tubular level vials, wherein when the openings of the pair of end caps receive the member, the pair of vials have a location in a plane transverse to the member.

BRIEF DESCRIPTION OF THE DRAWINGS

A better understanding of the present invention will be had upon reference to the following description in conjunction with the accompanying drawings, wherein.

DETAILED DESCRIPTION OF THE PREFERRED EMBODIMENT

Figure 1:
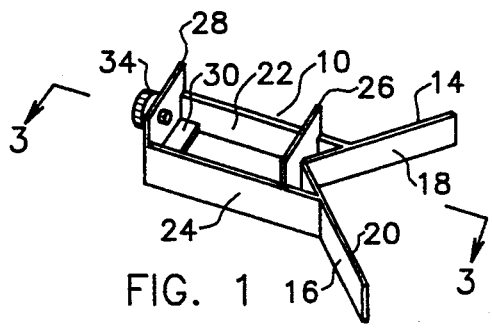
FIG. 1 shows a perspective view of the top end cap of the preferred embodiment.
Figure 2:
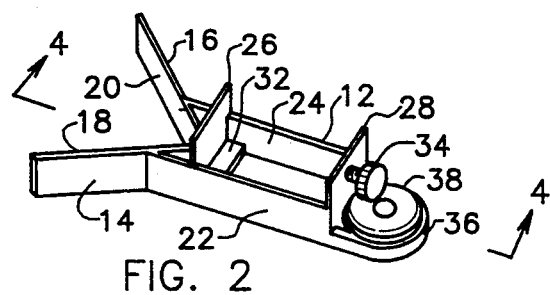
FIG. 2 shows a perspective view of the bottom end cap of the preferred embodiment having a bull's eye level.
Figure 6:
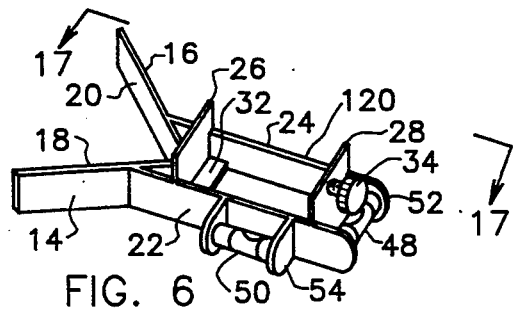
FIG. 6 shows a perspective view of an alternative bottom end cap to that shown in FIG. 2, the bull's eye level being replaced with a pair of transverse vial levels.
Figure 3:
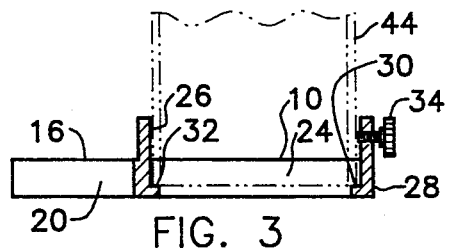
FIG. 3 shows a cross sectional view of the top end cap of FIG. 1 along the lines 3—3.
Figure 4:
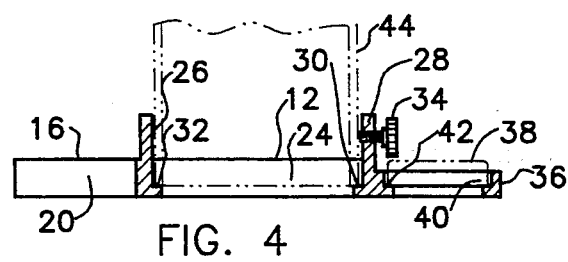
FIG. 4 shows a cross sectional view of the bottom end cap of FIG. 2 along the lines 4—4.
Figure 5:
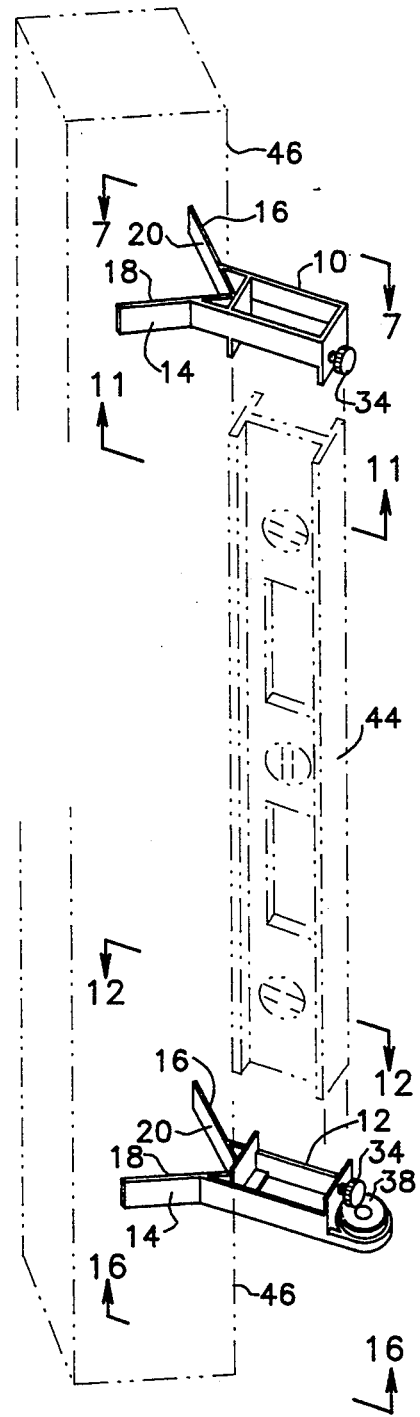
FIG. 5 shows a perspective view of the top end cap of FIG. 1 and the bottom end cap of FIG. 2 for attachment to a level to measure verticality of a post.
Figure 7:
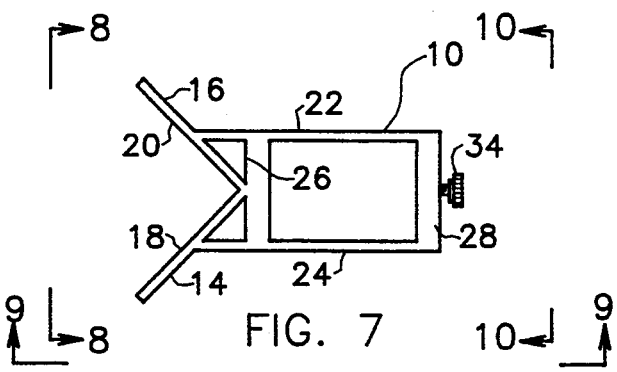
FIG. 7 shows a top view of the top end cap of FIG. 5 along the lines 7—7.
Figure 8:
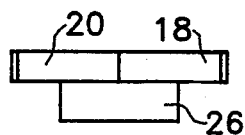
FIG. 8 shows a left end view of the top end cap of FIG. 7 along the lines 8—8.
Figure 9:
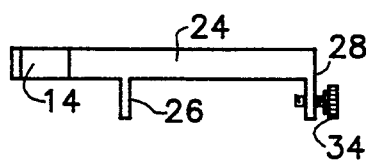
FIG. 9 shows a side view of the top end cap of FIG. 7 along the lines 9—9.
Figure 10:
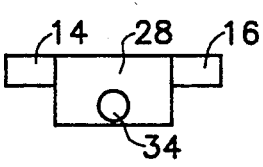
FIG. 10 shows a right end view of the top end cap of FIG. 7 along the lines 10—10.
Figure 11:
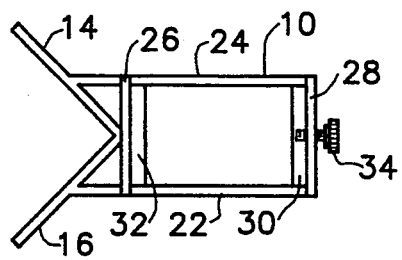
FIG. 11 shows a bottom view of the top end cap of FIG. 5 along the lines 11—11.
Figure 12:
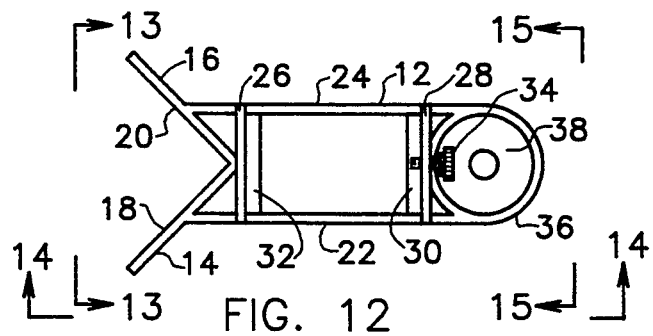
FIG. 12 shows a top view of the bottom end cap of FIG. 5 along the lines 12—12.
Figure 13:
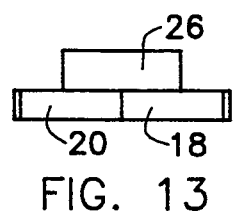
FIG. 13 shows a left end view of the bottom end cap of FIG. 12 along the lines 13—13.
Figure 14:
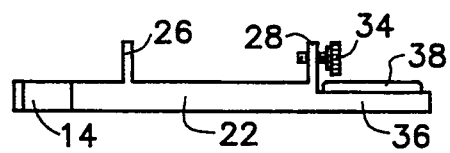
FIG. 14 shows a side view of the bottom end cap of FIG. 12 along the lines 14—14.
Figure 15:
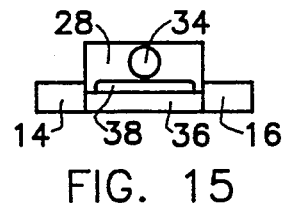
FIG. 15 shows a right end view of the bottom end cap of FIG. 12 along the lines 15—15.
Figure 16:
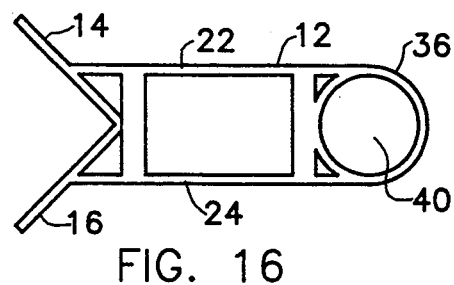
FIG. 16 shows a bottom view of the bottom end cap of FIG. 5 along the lines 16—16.
Figure 18:
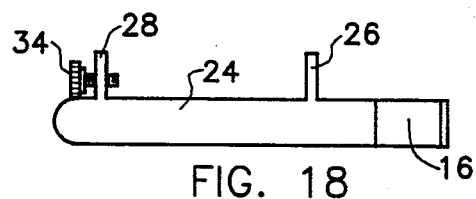
FIG. 18 shows a back side view of the bottom end cap of FIG. 17 along the lines 18—18.
Figure 17:
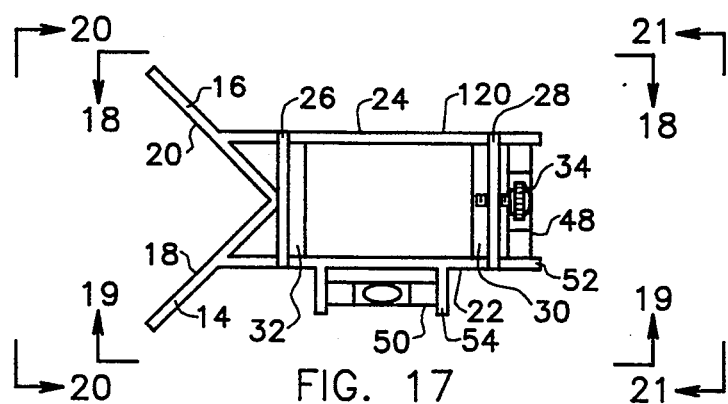
FIG. 17 shows a top view of the alternative bottom end cap of FIG. 6 along the lines 17—17.
Figure 20:
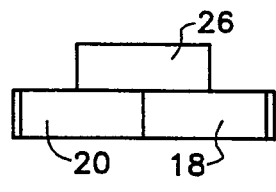
FIG. 20 shows a left end view of the bottom end cap of FIG. 17 along the lines 20—20.
Figure 19:
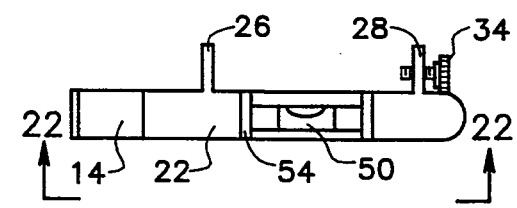
FIG. 19 shows a front side view of the bottom end cap of FIG. 17 along the lines 19—19.
Figure 21:
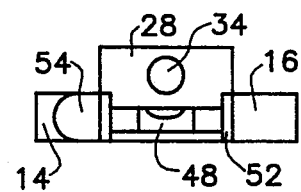
FIG. 21 shows a right end view of the bottom end cap of FIG. 17 along the lines 21—21.
Figure 22:
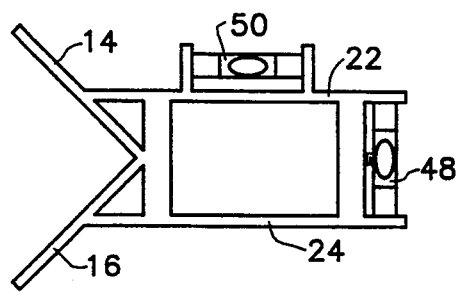
FIG. 22 shows a bottom view of the bottom end cap of FIG. 19 along the lines 22—22.

With reference to FIG. 5, the preferred embodiment of the plumb tool kit of the present invention is shown having a pair of end caps 10 and 12 for attachment to the ends of a common level 44, or the like, used to determine vertical alignment of post 46, for example. Bottom or first end cap 12 includes a means for determining verticality, shown as a bull's eye level 38. Any determining means can be employed and some alternatives are shown in other figures and discussed later. Both the end cap 12 and the top or second end cap 10 include means for retaining the caps 10 and 12 onto level 44. For example, as shown, thumb screw 34 can be tightened to exert pressure onto level 44 and retain the respective cap 10 or 12 thereon.

In addition to FIG. 5, the bottom or first end cap 12 is shown in FIGS. 2, 4, and 12-16. First end cap 12 has a cap body including a first pair of parallel side members 22 and 24 and a second pair of parallel side members 26 and 28. The second pair of parallel side members 26 and 28 and the first pair of parallel side members 22 and 24 are in a transverse alignment being perpendicular to each other thereby, for example, forming a rectangular shape. The cap body includes a pair of coplanar stop members 30 and 32. The stop members 30 and 32 and the first 22 and 24 and the second 26 and 28 pair of parallel side members are in a transverse alignment, the stop members 30 and 32 and the first 22 and 24 and the second 26 and 28 pair of parallel side members defining an opening to receive a member, such as level 44. The cap body of first end cap 12 has a first 14 and a second 16 arm extending therefrom, the first 14 and the second 16 arms forming a right angle. Arms 14 and 16 have respective interior surfaces 18 and 20 which engage post 46, for example. As shown, for example, arms 14 and 16 are attached to side members 22, 24, and 26. Other constructions are possible.

As stated, the first end cap 12 has means for determining vertical alignment, shown as bull's eye level 38. A bull's eye level support 36 extends from the cap body. Support 36 has an opening 40 therein having a seating ledge 42 therein for receiving level 38. For example, level 38 can be press fit therein to be secured in opening 40 on ledge 42. It is noted that level 38 lies in a plane transverse to level 44 when cap 12 is attached to level 44.

In addition to FIG. 5, the top or second end cap 10 is shown in FIGS. 1, 3, and 7-11. In the preferred embodiment, cap 10 is identical to cap 12 except it does not include a means for determining verticality. Both caps 10 and 12 can include determining means and examples are discussed later. As with first end cap 12, second end cap 10 has a cap body including a first pair of parallel side members 22 and 24, a second pair of parallel side members 26 and 28, and a pair of coplanar stop members 30 and 32, all aligned as they are in the first cap 12. The cap body of second end cap 10 also has a first 14 and a second 16 arm extending therefrom, the first 14 and the second 16 arms forming a right angle. Arms 14 and 16 have respective interior surfaces 18 and 20 which engage post 46, for example. Again, as shown with cap 12, for example, arms 14 and 16 of cap 10 are attached to its side members 22, 24, and 26.

When caps 10 and 12 are attached to the level 44, the first cap 12 first 14 and second 16 arms are transverse to level 44 and the second cap 10 first 14 and second 16 arms are transverse to level 44. The first 12 and second 10 cap first arms 14 and at least a portion of level 44, depending on its shape, lie in a first plane and the first 12 and second 10 cap second arms 16 and at least a portion of level 44 lie in a second plane.

As shown, the first end cap 12 includes means for retaining the first end cap onto level 44 and the second end cap 10 includes means for retaining the second end cap 10 onto level 44. This is provided by a threaded bore in side 28 which has a thumb screw 34 threaded therein. Screws 34 of caps 10 and 12 are tightened onto level 44 to secure caps 10 and 12 thereon. Many other retaining means can be employed and screws 34 are provided as only one example.

Caps 10 and 12 can be formed of any suitable rigid material. For example, die-cast aluminum or a molded thermoplastic could be employed.

FIGS. 6 and 17-22 show an alternative embodiment for bottom cap 12, that being cap 120. Cap 12 employed bull's eye level 38. As an alternative, cap 120 includes, as a verticality determining means, a pair of transversely aligned tubular level vials 48 and 50. Vials 48 and 50 are attached to respective supports 52 and 54, which, for example, extend from members 28 and 22 respectively. Other attachments are possible providing that, when cap 120 is attached to level 44, vials 48 and 50 will lie in a plane transverse to level 44.

Figure 23:
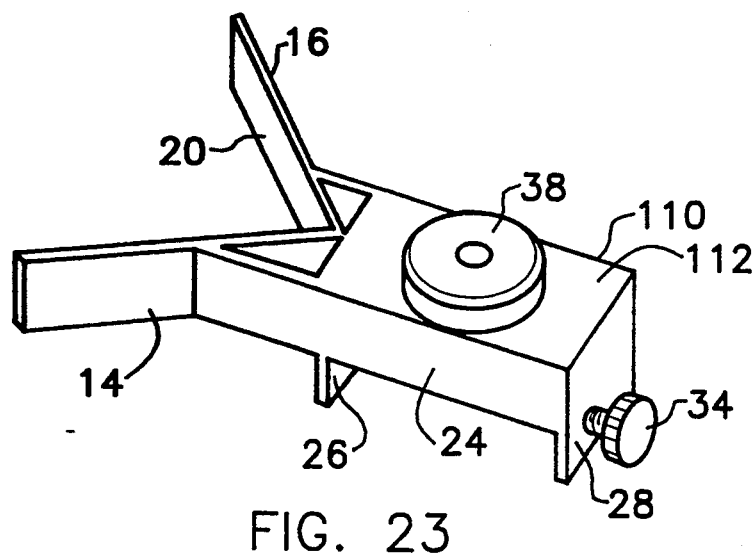
FIG. 23 shows a perspective view of a first alternative top cap to that of FIG. 1, incorporating a bull's eye level therein; and, FIG. 24 shows a perspective view of a second alternative top cap to that of FIG. 1, incorporating a pair of transverse level vials therein.
Figure 24:
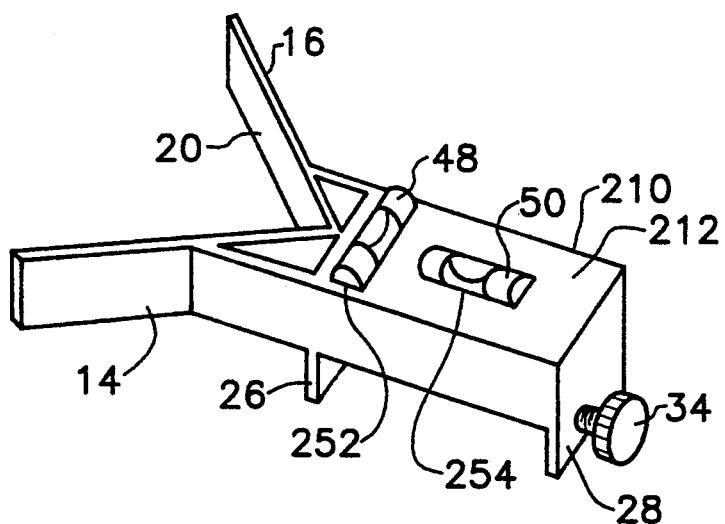

As mentioned, the preferred embodiment only includes verticality determining means in bottom cap 12. This is because of cost and because, for most applications, the user will be on the ground or the bottom cap will be the easiest to view. However, it is envisioned that for some applications, the kit can be employed where it would be advantageous to be able to determine verticality by looking at the top cap 10. Therefore, as seen in FIGS. 23 and 24, two alternative top caps 110 and 210, respectively, are shown. FIG. 23 depicts employment of a bull's eye level 38 and FIG. 24 depicts employment of a pair of transversely oriented vials 48 and 50. Cap 110 of FIG. 23 includes a level support 112 between members 22, 24, 26, and 28. Cap 210 of FIG. 24 includes a level support 212 between members 22, 24, 26, and 28. Support 212 includes level cradles 252 and 254 to receive vials 48 and 50 respectively. Cradles 252 and 254 provide some protection for vials 48 and 50.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A plumb tool kit attachable to opposed ends of a common level member, or a plain beam member, to form a tool used to determine vertical alignment of an object, comprising:

a pair of end caps insertable onto the opposed ends of the member, each of said pair of end caps having a cap body; said cap body having a first and second arm extending therefrom to engage the object, said first and second arms forming a right angle; said cap body having an opening therein to receive the member, said opening having a preselected orientation wherein when said openings of said pair of end caps receive said member, said arms are transverse to said member, said first arms and at least a portion of said member defining a first plane and said second arms and at least a portion of said member defining a second plane; at least one of said pair of end caps having means for determining vertical alignment in at least a third and a fourth plane, said third plane bisecting said first and said second planes, said fourth plane being perpendicular to said third plane.

2. The plumb tool kit of claim 1, wherein said pair of end caps include means for retaining said end cap onto said member.

3. The plumb tool kit of claim 1, wherein said means for determining vertical alignment comprises a bull's eye level, wherein when said openings of said pair of end caps receive said member, said bull's eye level has a location in a plane transverse to said member.

4. The plumb tool kit of claim 1, wherein said means for determining vertical alignment comprises a pair of transversely aligned tubular level vials, wherein when said openings of said pair of end caps receive said member, said pair of vials have a location in a plane transverse to said member.

5. A plumb tool kit attachable to opposed ends of a common level member, or a plain beam member, to form a tool used to determine vertical alignment of an object, comprising:

a first end cap, said first end cap having a cap body; said cap body including a first pair of parallel side members and a second pair of parallel side members, said second pair of parallel side members and said first pair of parallel side members being in a transverse alignment, said cap body including a pair of coplanar stop members, said stop members and said first and said second pair of parallel side members being in a transverse alignment, said stop members and said first and said second pair of parallel side members defining an opening to receive a member; said cap body having a first and a second arm extending therefrom, said first and said second arms forming a right angle; said first end cap having means for determining vertical alignment;

a second end cap, said second end cap having a cap body; said cap body including a first pair of parallel side members and a second pair of parallel side members, said second pair of parallel side members and said first pair of parallel side members being in a transverse alignment, said cap body including a pair of coplanar stop members, said stop members and said first and said second pair of parallel side members being in a transverse alignment, said stop members and said first and said second pair of parallel side members defining an opening to receive a member; said cap body having a first and a second arm extending therefrom, said first and said second arms forming a right angle;

wherein when said openings of said first and said second end caps receive said member to form the tool, said first cap first and second arms are transverse to said member, said second cap first and second arms are transverse to said member, said first and second cap first arms and at least a portion of said member defining a first plane and said first and second cap second arms and at least a portion of said member defining a second plane;

and, wherein, to use the tool to determine vertical alignment of the object, said first and second arms of said first and second end caps are engaged with the object, said means for determining vertical alignment having an orientation so as to measure in at least a third plane and a fourth plane, said third plane bisecting said first and said second planes, said fourth plane being perpendicular to said third plane.

6. The plumb tool kit of claim 5, wherein said first end cap include means for retaining said first end cap onto said member and wherein said second end cap include means for retaining said second end cap onto said member.

7. The plumb tool kit of claim 5, wherein said first end cap means for determining vertical alignment comprises a bull's eye level, wherein when said openings of said first and second end caps receive said member, said bull's eye level has a location in a plane transverse to said member.

8. The plumb tool kit of claim 5, wherein said means for determining vertical alignment comprises a pair of transversely aligned tubular level vials, wherein when said openings of said first and second end caps receive said member, said pair of vials have a location in a plane transverse to said member.

9. A tool used to determine whether a first location of an object and a second location of an object are in vertical alignment, the second location being distant the first location, the tool comprising:

a. a member of desired length having a first opposed end and a second opposed end;

b. a first end cap, said first end cap having a cap body; said cap body including a first pair of parallel side members and a second pair of parallel side members, said second pair of parallel side members and said first pair of parallel side members being in a transverse alignment, said cap body including a pair of coplanar stop members, said stop members and said first and said second pair of parallel side members being in a transverse alignment, said stop members and said first and said second pair of parallel side members defining an opening to receive said first opposed end of said member; said cap body having a first and a second arm extending therefrom, said first and said second arms forming a right angle; said first end cap having means for determining vertical alignment;

c. a second end cap, said second end cap having a cap body; said cap body including a first pair of parallel side members and a second pair of parallel side members, said second pair of parallel side members and said first pair of parallel side members being in a transverse alignment, said cap body including a pair of coplanar stop members, said stop members and said first and said second pair of parallel side members being in a transverse alignment, said stop members and said first and said second pair of parallel side members defining an opening to receive said second opposed end of said member; said cap body having a first and a second arm extending therefrom, said first and said second arms forming a right angle;

d. said opening of said first end cap receiving said first opposed end of said member and said opening of said second end cap receiving said second opposed end of said member to form the tool, said first cap first and second arms being transverse to said member, said second cap first and second arms being transverse to said member, said first and second cap first arms and at least a portion of said member defining a first plane and said first and second cap second arms and at least a portion of said member defining a second plane; and e. wherein, to use the tool to determine whether the first location of the object and the second location of the object are in vertical alignment, said first and second arms of said first end cap are engaged with the first location of the object and said first and second arms of said second end cap are engaged with the second location of the object, said means for determining vertical alignment having an orientation so as to measure in at least a third plane and a fourth plane, said third plane bisecting said first and said second planes, said fourth plane being perpendicular to said third plane.

10. The tool of claim 9, wherein said first end cap includes means for retaining said first end cap onto said first opposed end of said member and wherein said second end cap includes means for retaining said second end cap onto said second opposed end of said member.

11. The tool of claim 9, wherein said first end cap means for determining vertical alignment comprises a bull's eye level, said bull's eye level being in a fifth plane, said fifth plane being perpendicular to said first, second, third, and fourth planes.

12. The tool of claim 9, wherein said means for determining vertical alignment comprises a pair of perpendicularly aligned tubular level vials, said vials being in a fifth plane, said fifth plane being perpendicular to said first, second, third, and fourth planes, one of said vials being aligned in said third plane or a plane parallel thereto, the other vial being in a plane parallel to said fourth plane.

* * * * *